July 20, 1965 S. OKEN ETAL 3,196,430

ELECTRONIC DIGITAL TO SYNCHRO CONVERTER

Filed March 21, 1961

6 Sheets-Sheet 1

SEPARATION OF SECTOR & INTRA-SECTOR ANGLES.

INVENTORS
STANLEY OKEN
SEYMOUR ROOK
IRWIN MUNT
RICHARD RABIN
BY Borst & Borst
ATTORNEYS LINE TO LINE Vs LINE TO NEUTRAL VOLTAGES FOR SYNCHRO STATOR VOLTAGES INVENTORS
STANLEY OKEN
SEYMOUR ROOK
IRWIN MUNT
RICHARD RABIN
BY Borst & Borst
ATTORNEYS July 20, 1965 S. OKEN ETAL 3,196,430

ELECTRONIC DIGITAL TO SYNCHRO CONVERTER

Filed March 21, 1961

6 Sheets-Sheet 5

July 20, 1965 S. OKEN ETAL 3,196,430

ELECTRONIC DIGITAL TO SYNCHRO CONVERTER

Filed March 21, 1961 6 Sheets-Sheet 6

INVENTORS
STANLEY OKEN
SEYMOUR ROOK
IRWIN MUNT
RICHARD RABIN.

BY Borst & Borst ATTORNEYS

United States Patent Office 3,196,430
Patented July 20, 1965

3,196,430
ELECTRONIC DIGITAL TO SYNCHRO CONVERTER

Stanley Oken, Plainview, Seymour Rook, Bayside, and Irwin Munt, Bronx, N.Y., and Richard Rabin, Fairfield, Conn., assignors to Sperry Rand Corporation, Ford Instrument Company Division, Wilmington, Del., a corporation of Delaware Filed Mar. 21, 1961, Ser. No. 97,224
2 Claims. (Cl. 340—347)

This invention relates to computers which function to convert information from one representative form to another, and particularly to electronic converters designed to convert information in digital form to information in analog form and vice versa.

According to the present invention, there is provided an electronic digital angle to synchro voltage converter. The converter employs the concept of synthesizing the required analog information by processing the digital information in two parts. That is, whereas in this case the digital information is representative of synchro shaft position, the information is divided into data representing sector and intra-sector angles, with each intra-sector angle having a 60° range, this angle in digital form being employed in the analog derivation of the shaft angle within the sector which is designated the sector angle. The summation of sector and intra-sector angles constitutes the total digital angle. The total angle may be introduced directly to the converter in digital code, in which event components are provided for effecting the desired separation into sector and intra-sector angles, or may have been previously so resolved by external devices so that these components are bypassed within the converter.

One object of the invention is to provide an improved digital to analog converter.

Another object of this invention is to provide an electronic digital angle to synchro voltage converter which is capable of being multiplexed and is adapted for developing synchro voltages for single as well as multi-speed synchro systems.

Other objects and advantages of the converter may be appreciated on reading the following detailed description which is taken in conjunction with the accompanying drawings, in which FIGS. 1 and 1A are a combined schematic illustration of the converter;

Figure 6:
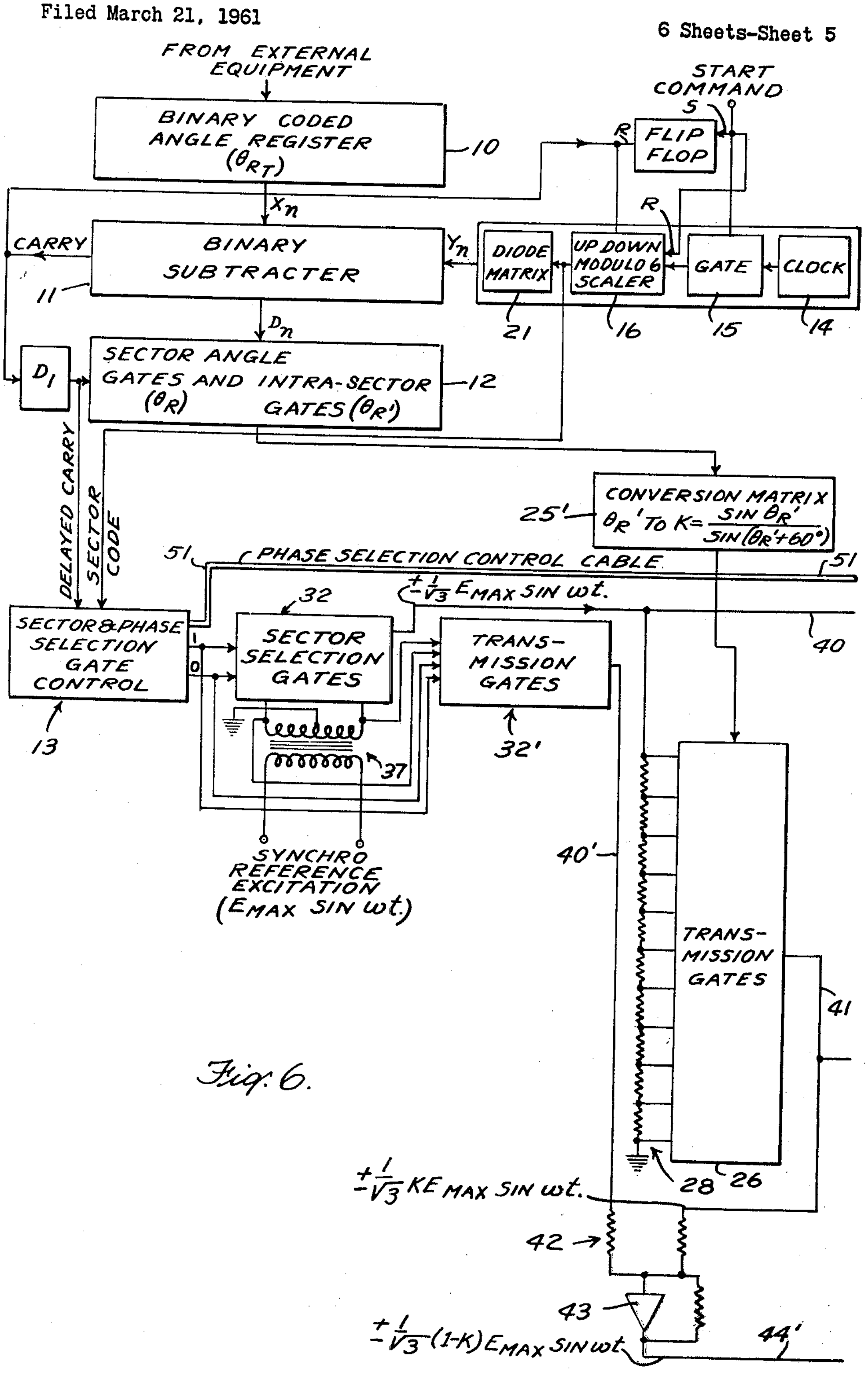
Figure 6A:
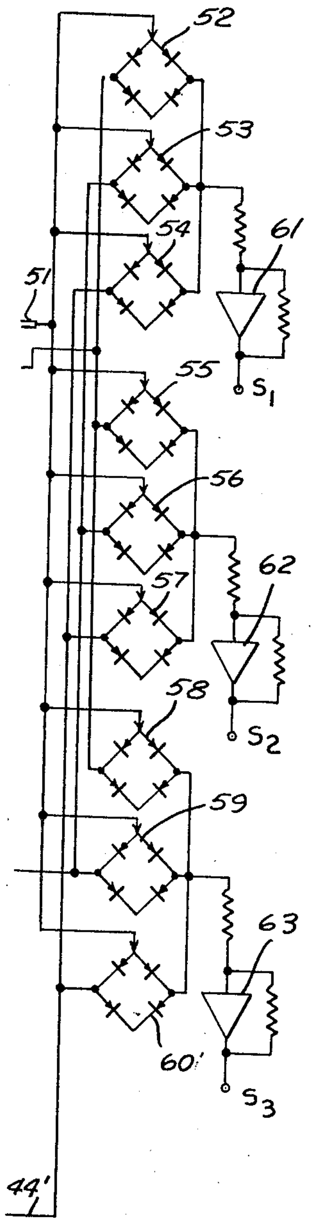

FIGS. 6 and 6A combined are a schematic of a modified converter; and

Figure 7:
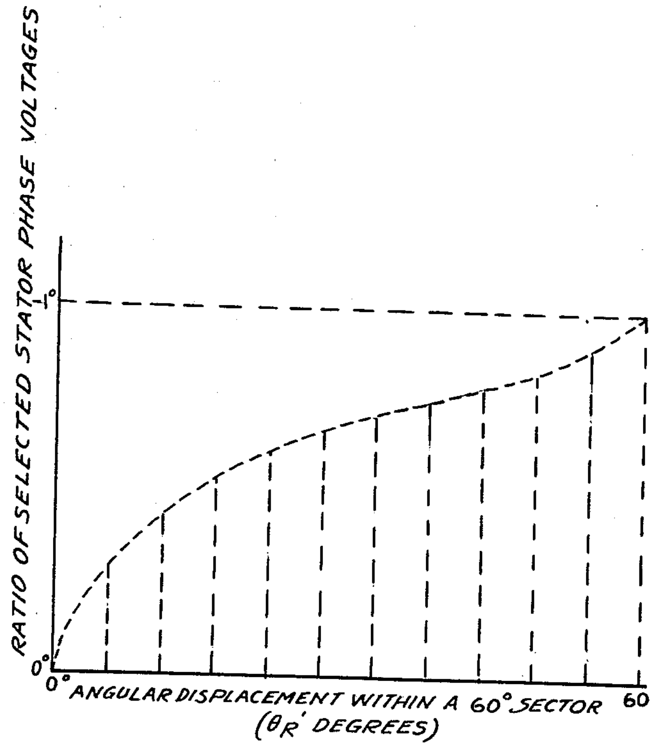

FIG. 7 is a synchro voltage ratio versus rotor displacement graph.

Figure 1:
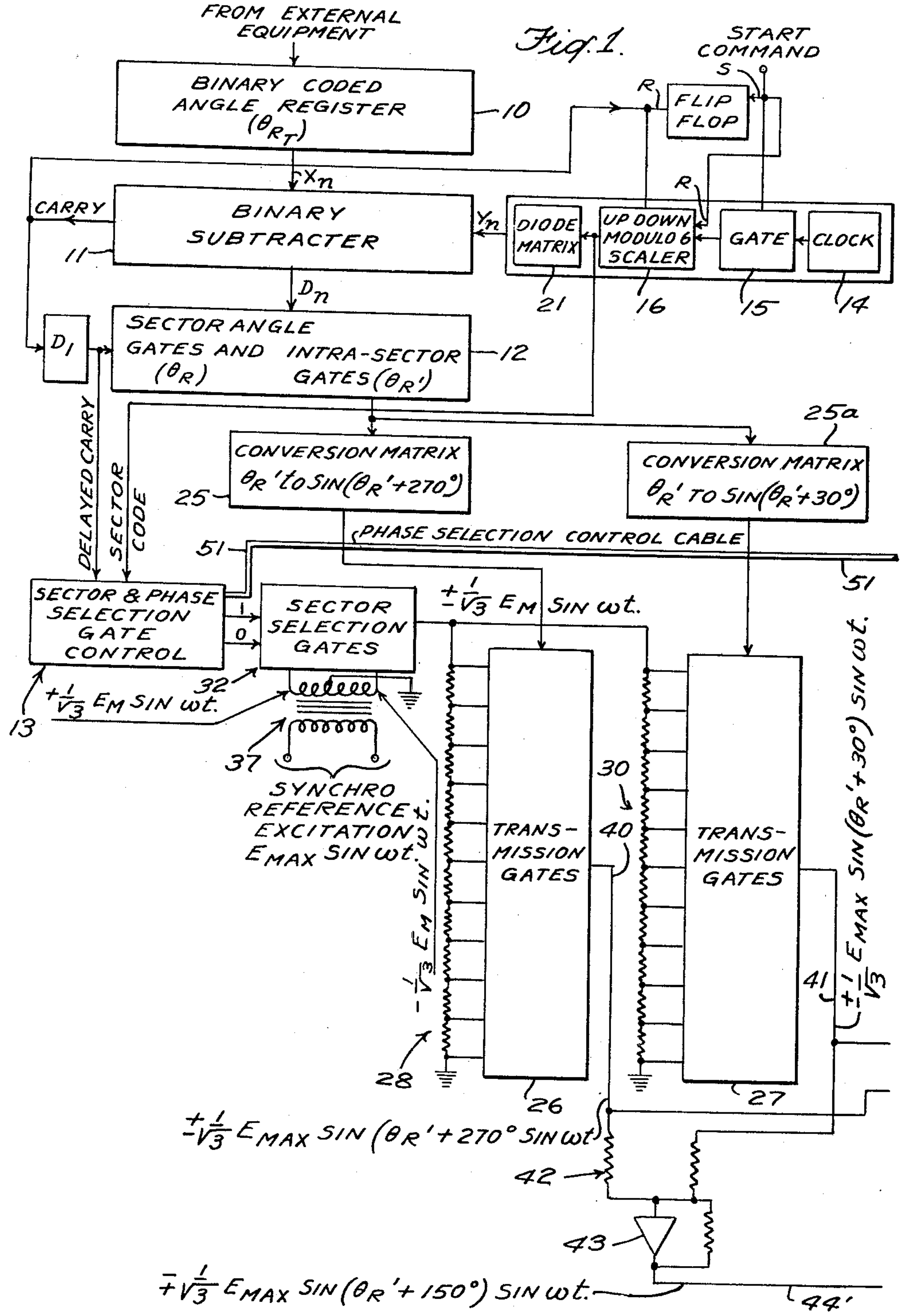

As shown in FIG. 1 the converter provides a means (blocks 11, 12, 13) to separate the original digital angle into sector and intra-sector angles although, as previously mentioned, this function can be omitted if this separation has already taken place in the external equipment employed to introduce the digital information into the converter. However, as shown, the digital angle $\theta_{RT}$ representing the total rotor angle position of a synchro is placed in the digital register 10 which registers the angle as binary coded information. A binary subtracter 11 receives this information and in turn delivers the separated angle data to the sector angle gates 12 which are connected to conversion matrices 25 and 25*a*. A gate control 13 is connected to output transmission gates 52 through 60 inclusive, and to sector transmission gates 32.

Figures 1A, 2:
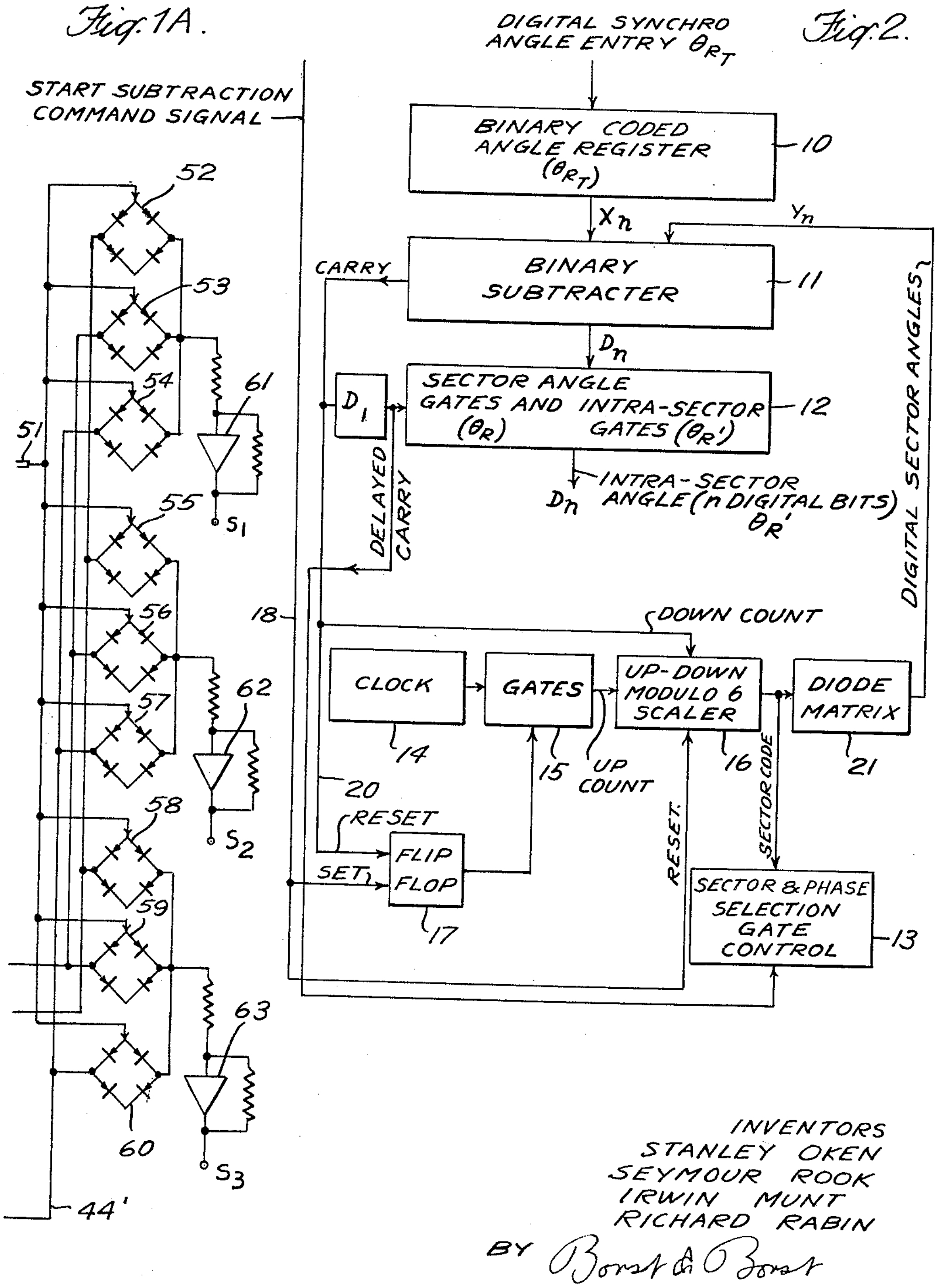
FIG. 2 is a block diagram of the section of the converter employed to separate the total digitally-coded synchro angle into sector and intra-sector angles.

The functional elements for the subtraction process, shown in greater detail in FIG. 2, comprise a clock oscillator 14 and gate 15 which are connected to a modulo 6 scaler 16, the gate 15 being controlled by a flip-flop 17. The scaler 16 and flip-flop 17 are connected by command signal conductor 18 and "carry" signal conductor 20 from the binary subtracter 11. A diode matrix 21 is disposed between the scaler 16 and the binary subtracter 11. The matrix is conventional in the digital computer art being designed to develop binary coded angles equivalent to the digital code furnished it by the scaler. A typical example of a matrix of this character is disclosed in application Ser. No. 26,834, filed May 4, 1960, now Pat. No. 2,984,831.

The clock oscillator 14 is utilized as a central timing source. This clock delivers a continuous train of voltage pulses at a fixed rate. Each time new angle information is presented to the input register of the converter, a "subtract" command signal "sets" the flip-flop 17 to a binary one state and resets the modulo 6 scaler 16 to the zero state. The flip-flop output enables logical gate 15 thereby permitting clock pulses to be counted by scaler 16. The scaler output is applied to the diode matrix 21 which is designed to develop binary equivalents as follows:

*Table I*

| Modulo 6 code: | Diode matrix output |
|---|---|
| 000 | Binary 330° |
| 001 | Binary 30° |
| 010 | Binary 90° |
| 011 | Binary 150° |
| 100 | Binary 210° |
| 101 | Binary 270° |

The digital angles $X_n$ from the input register 10 and the digital angles $Y_n$ from the diode matrix 21 are applied simultaneously to the binary subtracter 11. The computation $(X_n - Y_n)$ is performed and the resultant difference ($D_n$) is established in binary form on the output line of the subtracter. If the subtrahend (Y) is larger than the minuend (X), a "borrow" signal will be generated on the "carry" line 20 of the highest order digit in the subtracter.

When the gate 15 is enabled, clock pulses enter the scaler 16. The count in the scaler advances by one, each time a pulse is received. Upon receipt of the first pulse, the code 001 is set up. This code is presented to the matrix 21 which in turn generates the binary equivalent of 30°.

The binary angle thus generated is subtracted from the total angle $\theta_{RT}$ in the input register. If 30° is larger than the input angle, a "carry" signal will be generated by the subtracter. This signal will be immediately applied to the binary flip-flop 17 thus reversing its state and inhibiting the gate 15. At the same time, the carry signal is applied to scaler 16 on a "count down" line such that the count in the scaler reduces by one. As a result, the matrix output decreases to binary 330°, and the binary number on the output lines on the subtracter now represents the total input quantity ($\theta_{RT}$) minus 330 degrees. At this time the logical gates 12 of the subtracter are enabled by the "delayed" carry signal generated earlier. This delay ($D_1$) is accomplished by triggering a flip-flop from the trailing edge of a gate pulse generated by a one-shot multivibrator which has been triggered from the aforementioned "carry" signal. When the flip-flop is thus set to the one-state, the output gates 12 are enabled.

The binary output of the subtracter is, at time time, the desired intra-sector angle $\theta_{R'}$. The sector angle ($\theta_R$) is the binary output of the diode matrix. However, only a 3 bit code which signifies the sector angle is all that is required, and this is available at the output of the scaler 16. The separated sector and intra-sector angle codes are then channeled to the remaining conversion circuits via sector and phase selection gate control 13 enabled by the delayed carry signal.

If a carry signal is not generated on the subtraction of the first binary increment of 30°, successive clock pulses are permitted to enter the scaler. As the count advances, trial binary substractions of successively increasing sector angles are performed until a sector angle is reached which is larger than the input angle. At this point, a "carry" signal will be generated, and the previously described sequence of events which is instituted by the "carry" signal will take place.

The synchro analog voltages developed in the remaining circuitry of the conversion device herein described are with respect to a neutral reference, and in order that the line to line voltages required for synchro excitation have the correct amplitude and phase, the line to neutral voltages must be reduced in magnitude by $$\frac{1}{\sqrt{3}}$$

and shifted ahead in space phase relative to $\theta_{RT}$ by 30°. (See FIG. 3).

The binary equivalent of the intra-sector angle $\theta_{R'}$ represented in the output line of the logical gates 12 is placed in conversion matrixes 25 and 25*a* where it is converted to the binary equivalent of the quantities sin ($\theta_{R'}+270°$) and sin ($\theta_{R'}+30°$), respectively. These quantities are used to control transmission gates in boxes 26 and 27 on the pick-off side of voltage dividers 28 and 30, respectively. The voltage applied to the dividers is furnished by synchro reference transformer 37 through sector selection gates 32. The 3 bit sector angle code at the output of scaler 16 is applied to the sector and phase selection gate controller 13.

Figures 3, 4:
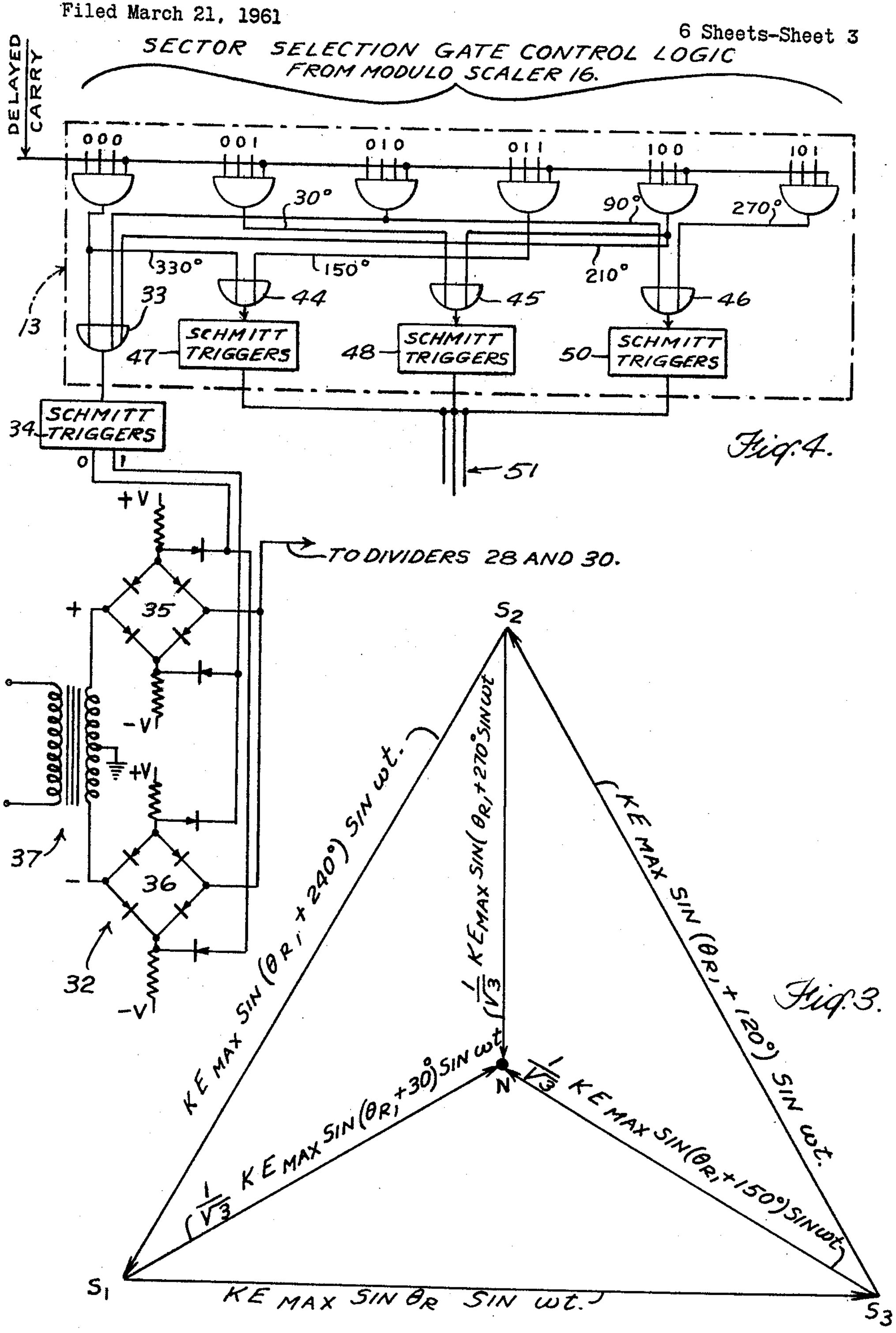
FIG. 3 is a voltage diagram showing line to line versus line to neutral voltages developed in a conventional synchro stator.
FIG. 4 is a block diagram of the sector selection gate arrangement.

As shown in FIG. 4, when the initial input angle fell in the sector 300°–360° the generated sector angle was 330° and the corresponding scaler code was 000. Similarly for each of the 5 remaining sectors, the binary angle generated by diode matrix 21 is 30° ahead of the lower of the two angles which define the sector. (See Table I.) As shown in FIG. 4, codes representing the generated sector angles of 90°, 210° and 330° are connected to the input of logical gate 33 which is in control of a Schmitt trigger 34, the state of which determines the polarity of the output of the transmission gate 32. This gate comprises a pair of analog voltage transmission gates 35 and 36 and a transformer 37. The theory of operation of the transmission gate is explained in the patent application aforementioned. A reference excitation derived from external equipment in which the synchro voltages to be generated will be used, is applied to the transformer 37 containing a center tapped secondary as shown in FIGURE 4. The analog voltage gates 35 and 36 are placed respectively in series with each end of the secondary winding. The outputs of these gates are "OR'D" together. Only one of the two gates will be enabled at any one time, the other being, in effect, an open circuit. The voltage generated at the output of the two gates will have reversible phase polarity dependent upon which gate is enabled. The polarity of the gates output is positive for generated sector angles of 90°, 210° and 330° and negative for generated sector angles of 30°, 150° and 270°.

Figure 5:
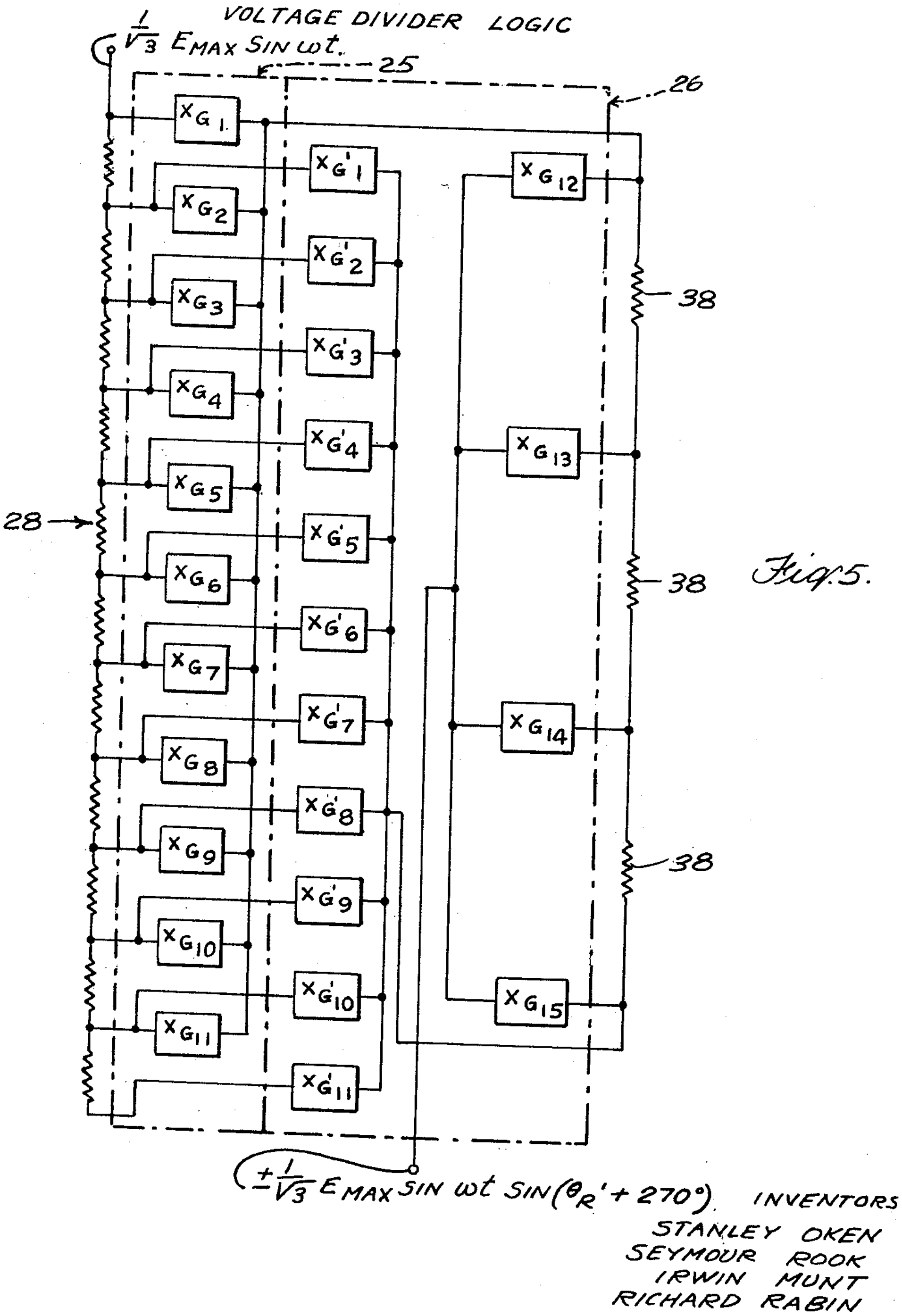
FIG. 5 is a schematic diagram illustrating the technique for using the digital intra-sector and sector angle information to develop the desired synchro voltages.

The circuit logic for deriving one of the 3 desired synchro analog voltages from the digital intra-sector angle information, is shown in FIG. 5. The transmission gates shown in this figure are those found in box 26 in FIG. 1, a duplicate arrangement of which is in the transmission gate box 27. Coarse voltage division is performed by transmission gates $X_{G_1} \ldots X_{G_{11}}$ which are connected to tap points on the divider 28 and to one side of voltage divider 38 and transmission gates $X_{G'_1} \ldots X_{G'_{11}}$ which are disposed between tap points on the voltage divider 28 and the other side of the divider 38. Vernier voltage division is performed by the cascaded divider 38 and transmission $X_{G_{12}} \ldots X_{G_{15}}$ conected to tap points thereon. The transmission gates are controlled by the digital output of conversion matrix 25 which converts the infra-sector angle $\theta_{R'}$ to sin ($\theta_{R'}+270°$), the binary code for which is broken into segments with separate segments controlling the two sections of the cascaded divider. For example, if sin ($\theta_{R'}+270°$) in represented by a six bit code, the two least significant bits may be used to select one of four tap points on the vernier voltage divider which is in the second section of the divider, while the four most significant bits are used to select the coarse voltage taps in the first section of the divider. This is in accordance with known techniques in the analog and digital computer art. There is thus placed on output conductor 40 an analog voltage representing the quantity $$\pm\frac{1}{\sqrt{3}}E_{max}\sin(\theta_{R'}+270°)\sin\omega t$$

Similarly, the voltage divider 30 in FIG. 1 energized by the polarity establishing voltage $$\pm\frac{1}{\sqrt{3}}E_{max}\sin\omega t$$

obtained from the sector angle section of the converter and tapped by transmission gates 27, which are controlled by the conversion matrix 25*a* places on its output conductor 41 the analog voltage $$\pm\frac{1}{\sqrt{3}}\sin\omega t\sin(\theta_{R'}+30°)$$

Assuming network 42 is connected to the conductors 40 and 41 and conveys the sum of the two alalogs to operational amplifier 43 which synthesizes the third synchro line to neutral voltage, $$\pm\frac{1}{\sqrt{3}}\sin\omega t\sin(\theta_{R'}+150°)$$

by deriving the negative of the sum of the first two synchro voltages. This voltage is placed on conductor 44'.

Besides determining the polarity of the synchro voltages, the sector angle section of the converter also serves to establish their phase relationship on the synchro leads $S_1$, $S_2$ and $S_3$ in the output. To this end the modulo 6 code applied to the sector selection gates 13 (see FIG. 4) and gates 44, 45 and 46 is employed to establish the condition of Schmitt triggers 47, 48 and 50 which, through phase selection control cable 51, control transmission gates 52–60 in the output side of the converter. Output lead $S_1$, is connected to the output of the transmission gates 52, 53 and 54; output lead $S_2$ is connected to the output of the gates 55, 56 and 57; and output lead $S_3$ is connected to the output of the gates 58, 59 and 60. Each line to neutral, stator voltage is selectively connected into any one of the output leads $S_1$, $S_2$ or $S_3$, as governed by the control signals from the sector angle section of the equipment. Accordingly, the conductor 40 is adapted to be connected to any one of three output leads by the transmission gates 52, 55 and 58; the conductor 41 is adapted to be connected to any one of the three output leads by the transmission gates 53, 56 and 59 and the conductor 44' is adapted to be connected to any one of the output leads by the transmission gates 54, 57 and 60. It is thus seen that the transmission gates function to channel the correct voltages to the three output lines as determined by the sector angle data and the resultant phase selection gate control voltages. The line amplifiers 61, 62 and 63 in the stator leads $S_1$, $S_2$ and $S_3$, respectively, are used to provide low impedance driving sources and to establish the desired voltage amplitude scale factor.

It may be shown that in each 60° interval of input angle rotation, that is, where the intra-sector angle, $\theta_{R'}$, varies from 0° to 60°, the ratio K of a selected two of the three stator voltages will vary uniquely from zero to unity. (See FIG. 7.) This ratio may be expressed mathematically as $$K=-\frac{\sin \theta_{R'}}{\sin (\theta_{R'}+60°)}$$

The modified converter system shown in FIG. 6 is the same as that above described except for the use of the synchro reference excitation, selectively poled, as one of the required phase voltages and use of the ratio K in binary form to control the transmission gates which in association with a single, cascaded voltage divider derive a second phase voltage. Accordingly, the sector selection gate control 13, which is activated by the sector angle data, is in polarity control of the transmission gate 32, as previously described, and also a second transmission gate 32′ with connections to the individual gates reversed so that the output of the latter is opposite in polarity to the output of the transmission gate 32. Hence, whereas the phase selection output voltage of the transmission gate 32 is $$\pm\frac{1}{\sqrt{3}}E_{\max} \sin \omega t$$

the synchro phase voltage output of the transmission gate 32′ is $$\mp\frac{1}{\sqrt{3}}E_{\max} \sin \omega t$$

the two gates being referenced by the synchro excitation voltage $E_{\max} \sin \omega t$.

The matrix 25′ generates binary coded values of K for each digital intra-sector angle. The codes thus established will in conjunction with suitable drivers such as the Schmitt triggers previously discussed provide the control required to enable any of the transmission gates in block 26 thereby tapping off the required percentage of the total voltage applied to the voltage divider 28 by the transmission gate 32.

The voltage $$\pm\frac{1}{\sqrt{3}}KE_{\max} \sin \omega t$$

provided on line 41 as the output of the transmission gates 26 is summed with $$\mp\frac{1}{\sqrt{3}}E_{\max} \sin \omega t$$

on the line 40′ in the adding network 42 and the operational amplifier 43 to produce the third required voltage $$\pm\frac{1}{\sqrt{3}}(1-K)E_{\max} \sin \omega t$$

The output gates 52–60 and the line amplifiers 61–63 perform in the same manner as in the converter shown in FIG. 1.

The systems described above may be easily modified for the conversion of digital data to fine and coarse synchro voltages. The converters would simply supply the fine and coarse voltages to two sets of output lines, the conversion being performed by the same components except on a time sharing basis with additional gates required to place the angle into the input register sequentially from the separate angle data sources. The sequence of operations would be controlled by a programmer or scanner of conventional design. Further, if the digital angle data presented to the converter is not initially separated into coarse and fine angles, there must be provided additional components to effect that separation. Digital computers are presently available for this purpose.

Various other modifications of the invention may be effected by persons skilled in the art without departing from the scope and principle of invention as defined in the appended claims.

What is claimed is:

1. An electronic digital to synchro converter comprising a digital register, a subtractor for generating a binary output representing intra-sector angles, said subtracter being connected to receive digital angle data from said register, means for introducing in said register a second set of clock controlled digital angle data for comparison with the data received from the register whereby said subtracter is enabled to generate difference signals representing intra-sector angles, said introducing means being adapted to yield an output representing sector angle, sector angle and intra-sector angle gates disposed to receive the separated sector angle and intra-sector angle data, a pair of conversion matrices connected to said gates to receive the intra-sector angle output, a pair of voltage dividers, transmission gates controlled by said matrices and connected to the output of said voltage dividers, sector selection gates connected to the input of said voltage dividers and energized by a synchro reference voltage, a sector and phase selection gate control connected to receive sector angle binary code signals from said introducing means for determining the polarity of the output of said sector selection gates and the phase of the voltages in the output of said converter, a summing network connected to the output of said transmission gates, and a plurality of synchro voltage output gates connected to said transmission gates and said summing network, the phase relation of the voltages in said output gates being controlled by said sector and phase selection gate control.

2. A converter as defined in claim 1 wherein said introducing means include a clock oscillator for generating a series of voltage pulses at a fixed rate and connected in series therewith, a gate, an up down modulo 6 scaler and a diode matrix, a flip-flop device connected to said gate and scaler and controlled by said subtractor and means for placing command signals in said flip flop device, said gate and said scaler.

References Cited by the Examiner

UNITED STATES PATENTS

| | | | |
|---|---|---|---|
| 2,817,078 | 12/57 | Pfeiffer | 340—347 |
| 2,969,489 | 1/61 | Spencer et al. | 340—347.3 |
| 2,984,831 | 5/61 | Oken et al. | 340—347.3 |
| 2,991,462 | 7/61 | Hose | 340—347.3 |

ROBERT C. BAILEY, *Primary Examiner.*

IRVING L. SRAGOW, LLOYD W. MASSEY, MALCOLM A. MORRISON, *Examiners.*